(12) United States Patent
Ojima

(10) Patent No.: US 6,483,655 B1
(45) Date of Patent: Nov. 19, 2002

(54) MAGNETIC-TAPE LIBRARY SYSTEM AND METHOD FOR CONTROLLING POSITIONING OF ACCESSOR TO MAGNETIC-TAPE DRIVE

(75) Inventor: Kenichi Ojima, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/452,164

(22) Filed: Dec. 1, 1999

(30) Foreign Application Priority Data

Dec. 11, 1998 (JP) .......................................... 10-353606

(51) Int. Cl.⁷ .......................... G11B 17/00; G11B 15/68
(52) U.S. Cl. .......................................... 360/69; 360/92
(58) Field of Search ..................... 360/69, 92; 700/214; 319/30.38–30.63; 414/932

(56) References Cited

U.S. PATENT DOCUMENTS

| | | | | | |
|---|---|---|---|---|---|
| 5,412,521 A | * | 5/1995 | Daiziel | ........................ | 360/92 |
| 5,454,485 A | * | 10/1995 | Dalziel | ........................ | 221/83 |
| 5,689,481 A | * | 11/1997 | Tamura et al. | ................. | 369/30 |
| 5,959,866 A | * | 9/1999 | Hanaoka et al. | ............. | 700/214 |
| 6,067,481 A | * | 5/2000 | Saliba et al. | ................. | 700/214 |

FOREIGN PATENT DOCUMENTS

JP          10-69689          3/1998

* cited by examiner

*Primary Examiner*—Andrew L Sniezek
*Assistant Examiner*—Mitchell Slavitt
(74) *Attorney, Agent, or Firm*—Young & Thompson

(57) ABSTRACT

A magnetic-tape library system for accurately mounting a magnetic tape on a magnetic-tape drive by using a hand assembly mounted on an accessor and a method for controlling the positioning of an accessor to the magnetic-tape drive. The magnetic-tape library system includes a magnetic-tape drive for at least reading data from a magnetic tape, an accessor mechanism for transferring a magnetic tape to and from the magnetic-tape drive, and a controller for controlling operations of the accessor mechanism.

19 Claims, 9 Drawing Sheets

MAGNETIC-TAPE LIBRARY SYSTEM AND METHOD FOR CONTROLLING POSITIONING OF ACCESSOR TO MAGNETIC-TAPE DRIVE

BACKGROUND OF THE INVENTION

1. Field of the Invention

The present invention relates to a magnetic-tape library system for accurately mounting a magnetic tape on a magnetic-tape drive by using a hand assembly mounted on an accessor and a method for controlling the positioning of an accessor to the magnetic-tape drive.

2. Description of the Prior Art

A cartridge tape must be accurately transferred from a cartridge-tape storing rack (or cell in a drum unit) to a magnetic-tape drive. By improving the mechanical accuracy of each component unit of a magnetic-tape library system, the possibility of accurate transfer is improved. However, a problem occurs that the cost of the library system is increased.

Therefore, development of a library system capable of accurately transferring a cartridge and making it possible to reduce the manufacturing cost has been attempted so far. For example, the official gazette of Japanese Patent Publication No. 10-69689 discloses a system for accurately transferring a cartridge considering the error between the optical axis of a photosensor for measuring the position of an accessor and the operating axis of a hand assembly provided for the accessor for holing a cartridge in order to correct the error between driving signal of the accessor and the actual driving position.

An accessor is positioned by a photosensor when a laser beam is applied to a marking for positioning from a laser-beam source and the photosensor receives the reflected light of the laser beam. Simple and accurate positioning has been performed so far in accordance with the above configuration. However, the positioning by the photosensor still has a problem.

The problem is described below by referring to FIG. 9. FIG. 9 shows a marking 100 for positioning provided for the front of the above-described magnetic-tape drive. The above-described laser beam is scanned along a read range 114. The marking 100 is located in the read range 114 and constituted of a black area 111 in black and white area 112 in white adjacent along the scanning direction L of the laser beam.

Thus, the boundary line 113 between the black area 111 and the white area 112 is identified when the reflected light of the laser beam changes from black to white through the above scanning. Because the position of the boundary line 113 is recognized, the position of the hand assembly is corrected in accordance with the position of the boundary line 113 and thereby, more precise positioning is performed.

However, the following problems occur in the above case.

First, because the marking 100 shown in FIG. 9 is put on the surface of the frame of the magnetic-tape drive, the circumference of the marking 100 is enclosed by the color of the ground of the frame. When the color of the frame is a color between white and black (e.g. gray), the laser beam reflected before the marking 100 may be recognized as black or white. Therefore, it may be seen as the change from black to white before the marking 100 and a position different from the original boundary line 113 may be erroneously recognized as a boundary.

However, by narrowing the read range 114 of a laser beam (the width of the laser beam in its scanning direction is assumed as X) into the range of the sum of the scanning-directional width A of the black area 111 and the scanning-directional width B of the white area 112 (X<A+B), it is possible to eliminate the influence of the circumference of the marking. To narrow the read range 114, however, it is necessary to improve the mechanical accuracy of an accessor mechanism and a problem occurs that the cost is resultantly increased.

The invention according to claim 1 comprises a magnetic-tape drive for at least reading data from a magnetic tape, an accessor mechanism for transferring a magnetic tape to and from the magnetic-tape drive, and a controller for controlling operations of the accessor mechanism.

Moreover, the accessor mechanism has a hand assembly for holding a magnetic tape and a predetermined-position detecting section provided for the hand assembly for detecting the predetermined position of the hand assembly to the magnetic-tape drive in accordance with the luminance of the reflected light due to scanning by a laser beam.

Furthermore, the magnetic-tape drive has a marking for positioning to be scanned by the laser beam. The marking is configured by two adjacent areas in black and white each other and these areas are arranged along the scanning direction of the laser beam.

Furthermore, the controller has a start position setting function for setting the scanning start position of the laser beam in a range closer to the marking than the sum of already-known widths of the two areas in their scanning directions before the marking and a positioning function for specifying the boundary between a black area and a white area in accordance with the change of luminances detected by the predetermined-position detecting section and already-known widths of the black area and white area in their scanning directions and positioning the hand assembly in accordance with the boundary position.

Operations will be described below. To position the hand assembly, scanning is performed by a laser beam from this side of the marking. Because the marking has black and white areas adjacent along the scanning direction, a state in which the luminance of the reflected light of the laser beam is low over the width of the black area and a state in which it is high over the width of the white area are continuously detected. Therefore, when the low luminance state is detected for the length equal to the already-known width of the black area and the high-luminance state following the low-luminance state is detected for the length equal to the already-known width of the white area, it is possible to specify the detection of the marking. Moreover, it is possible to specify that a position where luminances are greatly changed is present on the boundary line between the black area and the white area while the detection is performed.

On the other hand, because the area from a scanning start position up to this side of a marking which has been a problem so far is set to a value smaller than the width of the marking in its scanning direction, erroneous recognition of the marking in the this-side area cannot occur by specifying the marking by the above method.

In case of the invention according to claim 2, a controller comprises a memory for storing the already-known width of a black area in its scanning direction and that of a white area in its scanning direction, an area extracting section for extracting a white area and a black area in accordance with a detected luminance, and an area specifying section for specifying a white area and a black area in accordance with the already-known widths of areas stored in the memory.

In case of the invention according to claim 3, an accessor mechanism is characterized by being provided with a position detecting sensor for detecting the relative position relation between a hand assembly and a magnetic-tape drive and moreover, a controller has a roughly positioning section for positioning a hand assembly to a scanning start position in accordance with a relative positional relation for detecting a position detecting sensor.

In case of the invention according to claim 4, a position detecting sensor uses a photosensor.

In case of the invention according to claim 5, a black area is formed of a paint having a low light reflectance.

In case of the invention according to claim 6, at least the range from a scanning start position up to a marking in the area around the marking is made gray.

In case of the invention according to claim 7, areas of a marking are characterized by being arranged in order of a black area and a white area from a scanning start position toward the downstream side of a scanning direction.

In case of the invention according to claim 8, areas of a marking are characterized by being arranged in order of a white area and a black area from a scanning start position toward the downstream side of a scanning direction.

The invention according to claim 9 is provided with a magnetic-tape drive for at least reading data from a magnetic tape, an accessor mechanism for transferring a magnetic tape to and from the magnetic-tape drive, and a controller for controlling operations of the accessor mechanism.

Moreover, the accessor mechanism has a hand assembly for holding a magnetic tape and a predetermined-position detecting section provided for the hand assembly for detecting the predetermined position of the hand assembly to the magnetic-tape drive in accordance with the luminance of reflected light due to scanning by a laser beam.

Furthermore, the magnetic-tape drive has a marking for positioning to be scanned by a laser beam, in which the marking is configured by two adjacent areas in black and white, a black thin area and a white thin area whose scanning-directional widths are set to values smaller than the two adjacent areas, and the white thin area, black thin area, black area, and white area are arranged in order from the upstream side of the scanning directions. Moreover, the distance from the white thin area up to the black thin area is set to a value smaller than the sum of the already-known width of the white area and that of the black area and the distance from the black thin area up to the upstream side of the black area is set to a value smaller than the already-known width of the white area.

Moreover, the controller is provided with a start-position setting function for setting the scanning start position of the laser beam in a range from a position closer to the white thin area than the already-known width of the black area in its scanning direction before the white thin area up to this side of the black area and a positioning function for specifying the boundary between the black area and the white area in accordance with the change of luminances detected by the predetermined-position detecting section and the already-known widths of the black and white areas in their scanning directions and positioning the hand assembly in accordance with the position of the boundary.

To position the hand assembly, scanning by a laser beam is first performed from this side of the white thin area of the marking. The marking has a black area and a white area adjacent along the scanning direction and the black area is located at the upstream side. Therefore, a state in which the luminance of reflected light of the laser beam is low is detected over the width of the black area and then, a state in which that of reflected light of the laser beam is high is detected over the width of the white area. Therefore, when the low luminance state is detected for the length equal to the already-known width of the black area and then, the high luminance state is detected for the length equal to the already-known width of the white area, it is possible to specify the detection of the marking. Moreover, it is possible to specify that a position where luminances are greatly change while detection is performed is present on the boundary line between the black area and the white area.

On the other hand, as for the conventional problem of the area from a scanning start position up to this side of the black area of a marking, the interval from the scanning start position of a laser beam up to a white thin area is set to a value smaller than the already-known width of the black area, the distance from the white thin area up to the black thin area is set to a value smaller than the sum of widths of the already-known width of the white area and that of the black area, and the distance from the black thin area up to the upstream side of the black area is set to a value smaller than the already-known width of the white area.

Therefore, even when the mechanical accuracy of the accessor mechanism is lowered, the distance from the scanning start position up to this side of the black area is set to a large value (the distance is set to a value larger than the sum of widths of the black and white areas), and a luminance change equal to already-known widths of the black and white areas is detected in the above range, each thin area interferes with the luminance change to prevent a luminance change recognized as a marking from occurring. Therefore, erroneous recognition of a marking in this-side area does not occur.

In case of the invention according to claim 10, a controller is characterized by being provided with a memory for storing the already-known width of a black area in its scanning direction and that of a white area in its scanning direction, an area extracting section for extracting a white area and a black area in accordance with a detected luminance, and an area specifying section for specifying a white area and a black area in accordance with the already-known width of each area stored in the memory.

In case of the invention according to claim 11, an accessor mechanism is characterized by being provided with a position detecting sensor for detecting the relative positional relation between a hand assembly and a magnetic-tape drive and a controller has a roughly positioning section for positioning the hand assembly to a scanning start position in accordance with a relative positional relation for detecting the position detecting sensor.

In case of the invention according to claim 12, a range from a scanning start position up to the upstream-side end of a black area is characterized by being made gray except each thin area.

The inventions according to claims 13 to 16 show a case in which the sequence of a white area and a black area for their scanning directions and the sequence of a white thin area and a black thin area are replaced each other.

The invention according to claim 17 is a method for controlling the positioning of an accessor to the magnetic-tape drive of the magnetic-tape library system same as the invention of claim 1 except a controller, comprising:

a before-scanning positioning step of roughly positioning a hand assembly so that the scanning start position of a laser beam is positioned in a range closer to a marking than the sum of already-known widths of areas before a marking;

a scanning step of scanning an object with a laser beam by operating a predetermined-position detecting section and passing through a marking from a scanning start position;

an extracting step of extracting the then scanning range as a black area or a white area in accordance with the level of a luminance detected in accordance with the reflected light of a laser beam;

a specifying step of specifying the extracted black area and white area as a formal black area and a formal white area when the extracted black area and white area are continued and the width of the scanning range of the extracted black area becomes equal to or larger than the already-known width of the black area and that of the scanning range of the extracted white area becomes equal to or larger than the already-known width of the white area; and a finally positioning step of adjusting the position of the hand assembly in accordance with the boundary line between the specified formal black area and white area.

The invention according to claim 18 is a method for controlling the positioning of an accessor to the magnetic-tape drive of the magnetic-tape library system same as the invention of the above-described claim 9 except a controller, comprising:

a before-scanning positioning step of roughly positioning a hand assembly so that the scanning start position of a laser beam is set in a range from a position closer to a white thin area than the already-known width of a black area in its scanning direction before the white thin area up to this side of the black area;

a scanning step of scanning an object with a laser beam by operating predetermined-position detecting means and passing through a marking from the scanning start position;

an extracting step of extracting the then scanning range as a black area or a white area in accordance with the level of a luminance detected from the reflected light of the laser beam;

a specifying step of specifying the extracted black area and white area as a formal black area and a formal white area when the extracted black and white areas are continued and the width of the scanning range of the extracted black area becomes equal to or larger than the already-known width of the black area and the width of the scanning range of the extracted white area becomes equal to or larger than the already-known width of the white area; and a finally positioning step of adjusting the position of the hand assembly in accordance with the boundary line between the specified formal black and white areas.

The invention according to claim 19 is a method for controlling the positioning of an accessor to the magnetic-tape drive of the magnetic-tape library system same as the invention of the above-described claim 13 except a controller, characterized by comprising:

a before-scanning positioning step of roughly positioning a hand assembly so that the scanning start position of a laser beam is set in a range from a position closer to a black thin area than the already-known width of a white area in its scanning direction before the black thin area up to this side of the white area;

a scanning step of scanning an object with a laser beam by operating predetermined-position detecting means and passing through a marking from a scanning start position;

an extracting step of extracting the then scanning range as a white area or a black area in accordance with the level of the luminance detected from the reflected light of the laser beam;

a specifying step of specifying the extracted white area and black area as a formal white area and a formal black area when the extracted white and black areas are continued and the width of the scanning range of the extracted white area becomes equal to or larger than the already-known width of the white area and the width of the scanning range of the extracted black area becomes equal to or larger than the already-known width of the black area; and a finally positioning step of adjusting the position of the hand assembly in accordance with the boundary line between the specified formal white and black areas.

SUMMARY OF THE INVENTION

It is an object of the present invention to accurately detect the original boundary between a black area and a white area without being disturbed by an unstable-reflection color other than black or white in the scanning range of a laser beam when detecting the boundary between the black area and the white area of a marking used for positioning.

DETAILED DESCRIPTION OF THE PREFERRED EMBODIMENTS

Figure 1:
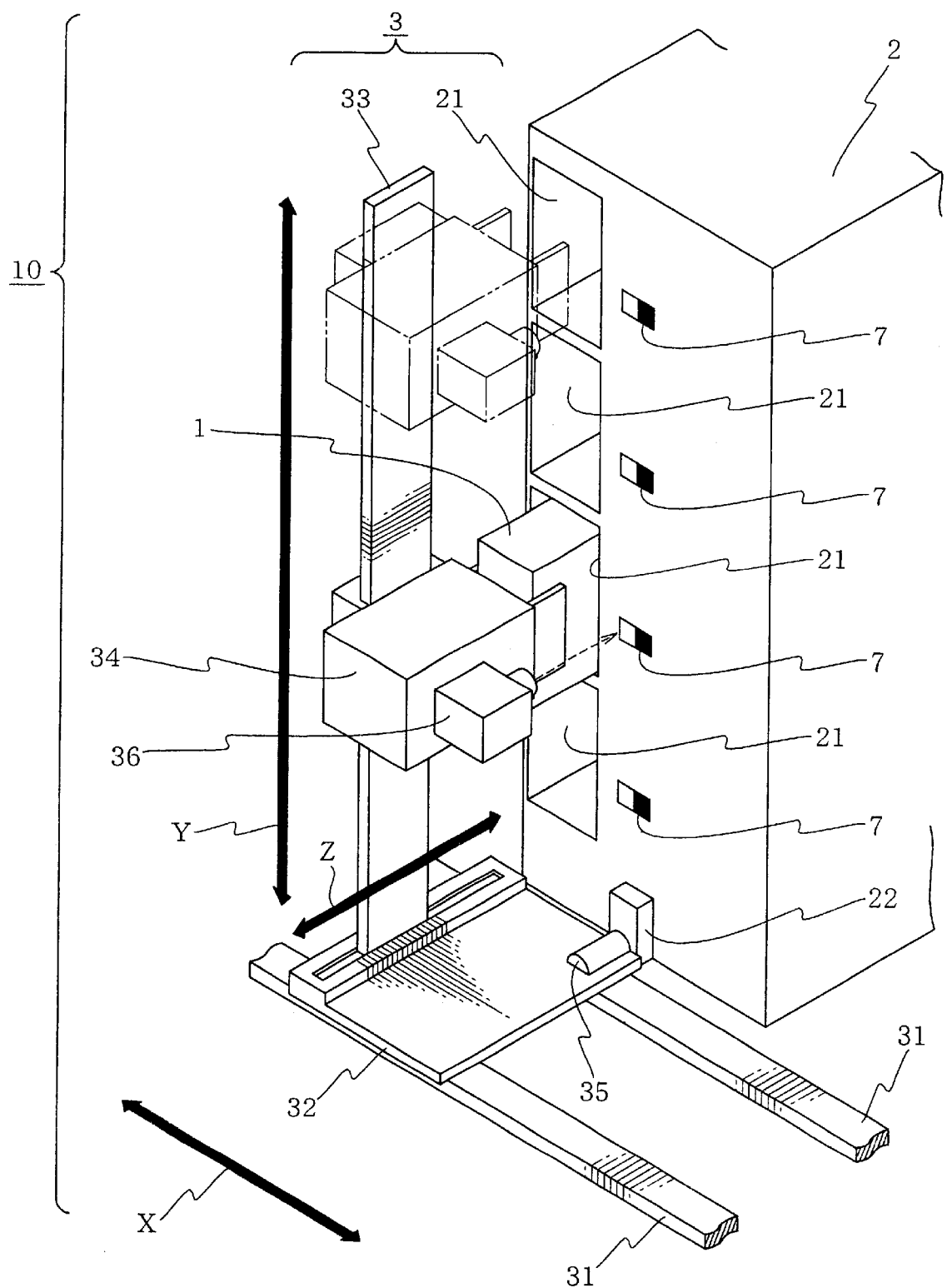
FIG. 1 is a schematic perspective view of a first embodiment.

First Embodiment:

A first embodiment of the present invention will be described below by referring to FIGS. 1 to 6. FIG. 1 shows a magnetic-tape library system 10 comprising a magnetic-tape drive 2 for reading or writing data from or in a magnetic tape 1, an accessor mechanism 3 for transferring the magnetic tape 1 to and from the magnetic-tape drive 2, and a controller 4 (not illustrated in FIG. 1 but illustrated in FIG. 3) for controlling operations of the accessor mechanism 3. Each section will be described below.

(Accessor mechanism)

The accessor mechanism 3 is provided with a base 32 to be reciprocated in X direction along two guide rails 31, a support 33 supported on the base 32 along Y direction, and a hand assembly 34 for holding the magnetic tape 1.

The accessor mechanism 3 transfers the magnetic tape 1 between a not-illustrated other magnetic-tape drive and a cartridge-tape storing rack (or cell in a drum unit) when the base 32 freely moves along the guide rails 31.

Moreover, the accessor mechanism 3 is provided with a photodiode 35 serving as a position detecting sensor for detecting the relative positional relation between the hand assembly 34 and the magnetic-tape drive 2. The photodiode 35 is fixed on the base 32 by turning the detection end toward the magnetic-tape drive 2. Moreover, the photodiode 35 outputs a detected signal to the controller 4, which is able to detect the state when a flag 22 provided for the magnetic drive 2 comes to the front of the photodiode 35.

Moreover, the base 32 is provided with a driving mechanism for reciprocally moving the support 33 along Z direction. Therefore, the support 33 freely approaches to and separates from the magnetic-tape drive 2.

The hand assembly 34 can freely move in Y direction along the support 33. Therefore, the hand assembly 34 moves in X, Y, and Z directions synchronously with the movement of the base 32 and support 33 and thereby performs positioning.

Moreover, the hand assembly 34 has a predetermined-position detecting section 36 for precisely detecting the predetermined position of the hand assembly 34 to the insertion slot 21 of the magnetic-tape drive 2 in accordance with the luminance of reflected light due to scanning by a laser beam. The predetermined-position detecting section 36 is provided with a laser beam source for irradiating the magnetic-tape drive 2 side and a photosensor for detecting the luminance (brightness) of reflected light due to laser-beam irradiation (not illustrated) and the photosensor outputs a signal corresponding to the luminance of reflected light to the controller 4. The predetermined-position detecting section 36 performs laser-beam irradiation while the base 32 moves in X direction and optically scans an irradiation object (marking 5 to be described later) with a laser beam.

(Magnetic-tape drive)

The magnetic-tape drive 2 is an apparatus for writing or reading data in or from the magnetic tape 1. The magnetic-tape drive 2 is provided with four insertion slots 21 of the magnetic tape 1 along Y direction in FIG. 1 on a plane facing the accessor mechanism 3.

Moreover, each insertion slot 21 has the marking 5 for positioning to be scanned by the laser beam of the predetermined-position detecting section 36 nearby the slot 21.

(Marking)

Figure 2:
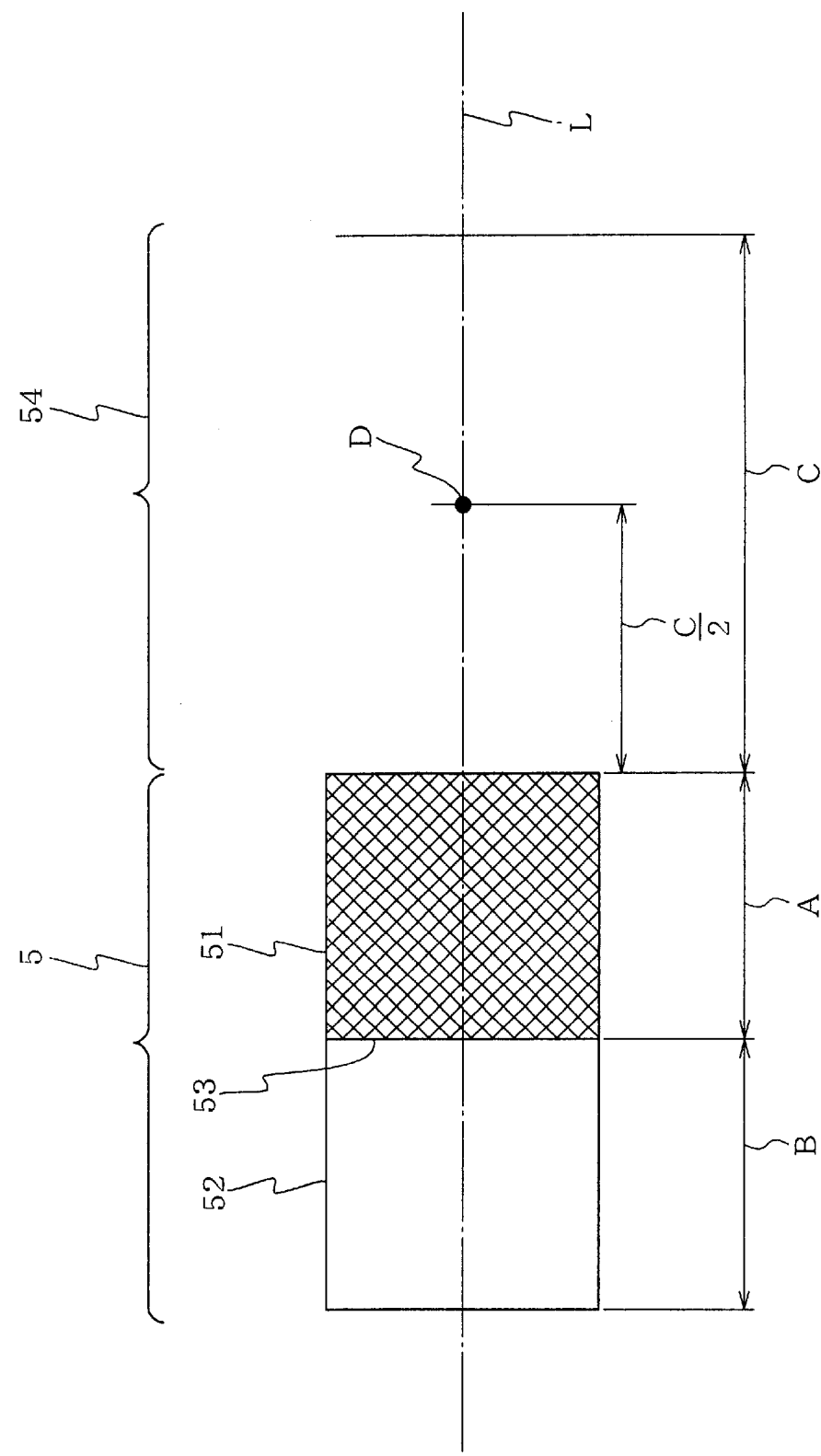
FIG. 2 is an enlarged view of a marking disclosed in the first embodiment.

FIG. 2 is an enlarged view of the marking 5. According to FIG. 2, each marking 5 is configured by two adjacent areas 51 and 52 in black and white. Symbol 53 denotes a boundary line between the areas 51 and 52. Moreover, these areas 51 and 52 are arranged along the scanning direction (X direction in FIG. 1) L and the black area 51 is located at the upper-stream side.

Furthermore, the boundary line 53 of the marking 5 is set so that the hand assembly 34 is brought to a preferred position to the insertion slots 21 when a laser beam just irradiates the boundary line 53 due to movement of the base 32 under scanning.

The circumference of the marking 5 is the wall of the frame of the magnetic-tape drive 2 and uniformly colored gray. However, the circumference of the marking 5 is not restricted to gray. Any color can be used as long as the luminance of reflected light under laser-beam irradiation is kept between the luminance of the black area 51 and that of the white area 52. Moreover, the black area 51 is formed of a delustering black paint having a low light reflectance in order to reduce the influence by laser-beam.

Symbol A denotes the width along the scanning direction L of the black area 51 and symbol B denotes the width along the scanning direction L of the white area 52. Moreover, symbol 54 denotes the upstream-side area of the marking 5 and symbol C denotes the width of the upstream-side area 54 in the scanning direction L. The width C is set so as to be equal to A+B.

(Controller)

The controller 4 is configured by an arithmetic logic unit including a CPU, a ROM, and an A/D converter, to which a program for executing control for operations of a magnetic-tape library system 10 to be described later is input. The controller 4 is provided with a start-position setting function for setting the scanning start position of a laser beam in a range of the upstream-side area 54 of the marking 5 and a positioning function for specifying the boundary line 53 between a black area and a white area in accordance with the change of luminances detected by the predetermined-position detecting section 36 and already-known widths of scanning directions of the black area 51 and white area 52 and positioning the position of the hand assembly 34 in accordance with the boundary position.

Figure 3:
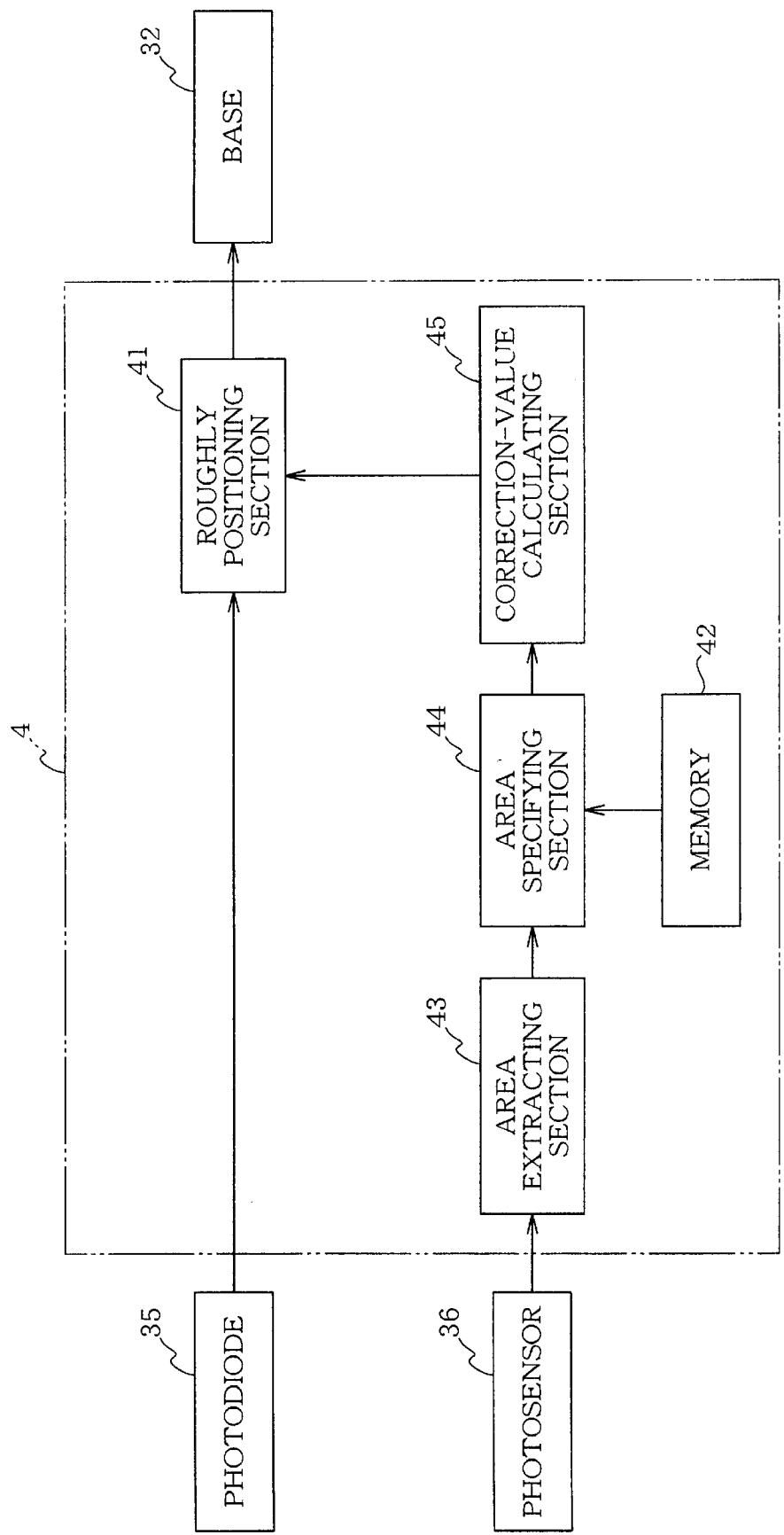
FIG. 3 is a block diagram of a control system of the first embodiment.

FIG. 3 is a block diagram showing the control system of the magnetic-tape library system 10. According to FIG. 3, the controller 4 is provided with a roughly positioning section 41 for positioning the base 32 to a predetermined position in accordance with a signal detected by the photodiode 35, a memory 42 for storing the already-known width A of the black area 51 and the already-known width B of the white area 52, an area extracting section 43 for extracting a white area and a black area in accordance with the luminance detected by the photosensor of the predetermined-position detecting section 36, an area specifying section 44 for specifying the black area 51 and the white area 52 in accordance with already-known widths A and B stored in the memory 42, and a correction-value calculating section 45 for calculating the position of the boundary line 53 in accordance with the output of the area specifying section 44 and outputting correction data to the roughly positioning section 41.

(Operations of magnetic-tape library system)

Figure 4:
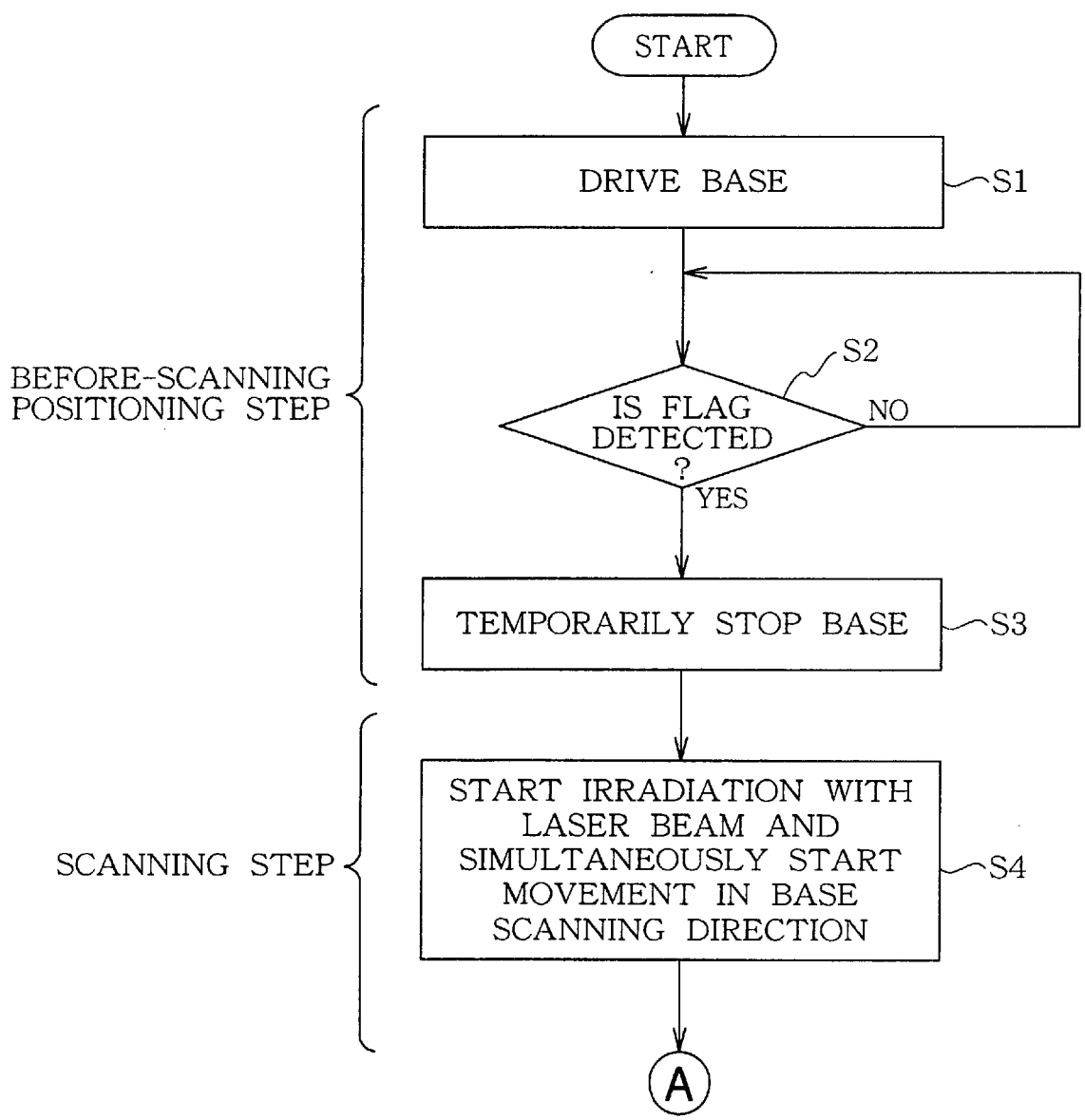
FIG. 4 is an operational flow chart of the first embodiment.
Figure 5:
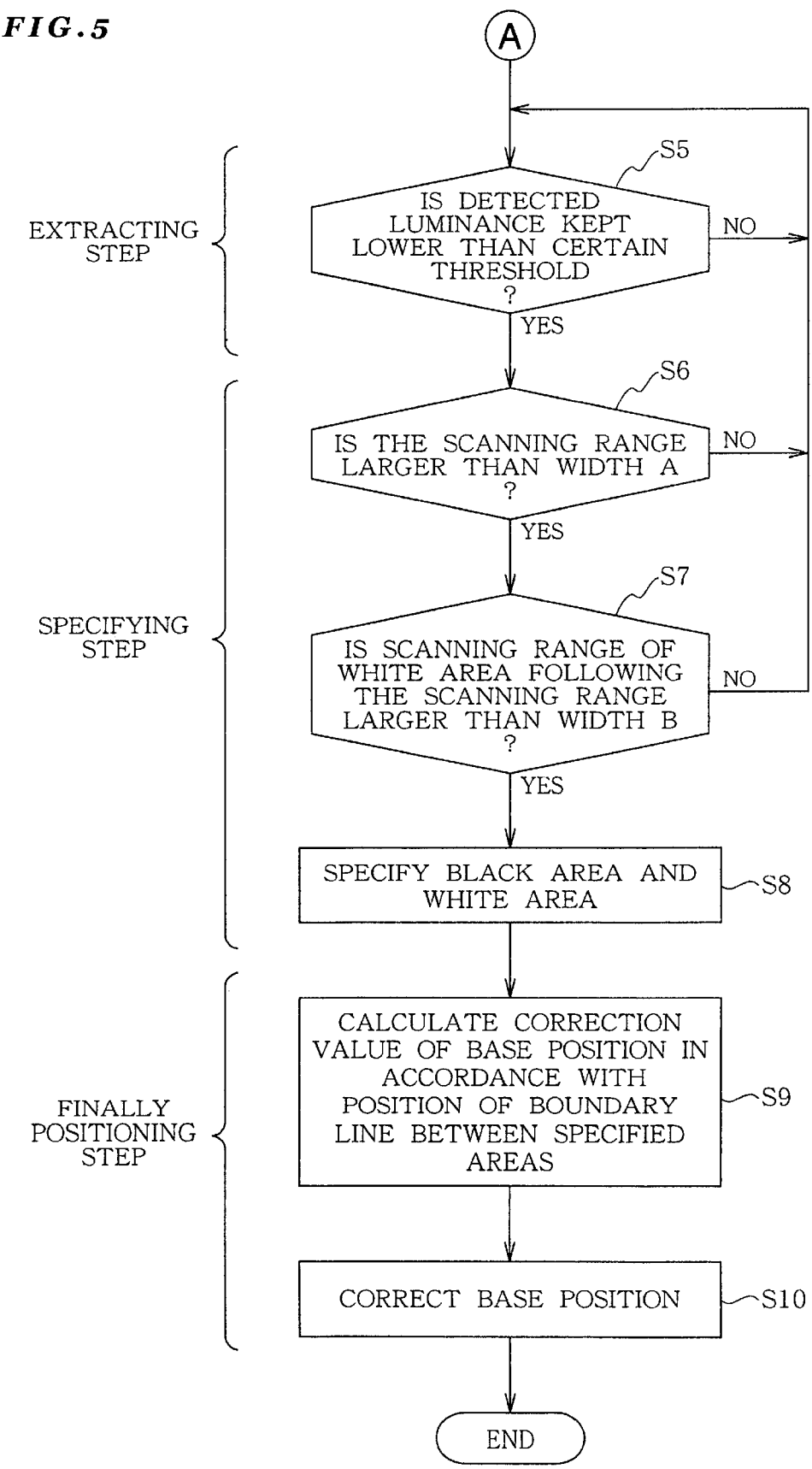
FIG. 5 is an operational flow chart of the first embodiment continuing to FIG. 4.

Operations of the magnetic-tape library system 10 will be described below by referring to FIGS. 1 to 5. FIGS. 4 and 5 are operational flow charts.

First, the accessor mechanism 3 is transferred up to the magnetic-tape drive 2 by driving the base 32 (step 1). In this case, the photodiode 35 detects the flag 22 of the magnetic-tape drive 2 (step S2) and thereby, the roughly positioning section 41 temporarily stops driving the base 32 (step S3). Under the stop state, the relative positional relation between the photodiode 35 and the flag 22 is set so as that the laser beam source of the predetermined-position detecting section 36 irradiates a target scanning-start position D located at the upstream side of the marking 5. The target scanning-start position D is located upstream than the marking 5 by a distance C/2. Moreover, the photodiode 35 has an accuracy equivalent to a displacement of less than ±C/2 from the scanning start position D. Therefore, the hand assembly 34 is positioned so that the scanning start position of the laser beam source of the predetermined-position detecting section 36 is kept in the range of the area 54 (before-scanning positioning step).

In the predetermined-position detecting section 36, irradiation of a laser beam is started from the above position. Moreover, the base 32 is driven again at the same time and moved along the scanning direction L. Thereby, scanning by the laser beam is performed from the scanning start position by passing through the marking 5 (step S4: scanning step).

Luminances detected by the photosensor of the predetermined-position detecting section 36 through the above scanning are successively input to the area extracting section 43. When a detected luminance is lower than a previously-set certain threshold, the area extracting section 43 regards the scanning range as a block area, while it is higher than the threshold, the section 43 regards the scanning range as a white area and thus, the section 43 successively outputs the areas to the area specifying section 44 (step S5: extracting step).

The area specifying section 44 judges whether the width of the scanning range extracted as a black area in the area extracting section 43 is equal to or larger than an already-known width A (step S6). When the width of the scanning range is equal to or larger than the width A, the section 44 judges whether the width of the scanning range of a white area extracted after the black area is equal to or larger than an already-known width B (step S7). Moreover, when the width of the scanning range is equal to or larger than the width B, the section 44 specifies the continuously extracted black and white areas as a formal black area and white area (step S8: specifying step).

Furthermore, the correction-value calculating section 45 calculates a correction value of the position of the base 32 in accordance with the distance from the scanning start position up to the boundary line between the formal black and white areas and outputs the correction value to the roughly positioning section 41 (step S9). The roughly positioning section 41 moves the base 32 in accordance with the correction value. Thereby, the position of the hand assembly 34 is accurately adjusted in X direction and the magnetic tape 1 is transferred to and from the magnetic-tape drive 2 at this position (step S10: finally positioning step).

Figure 6:
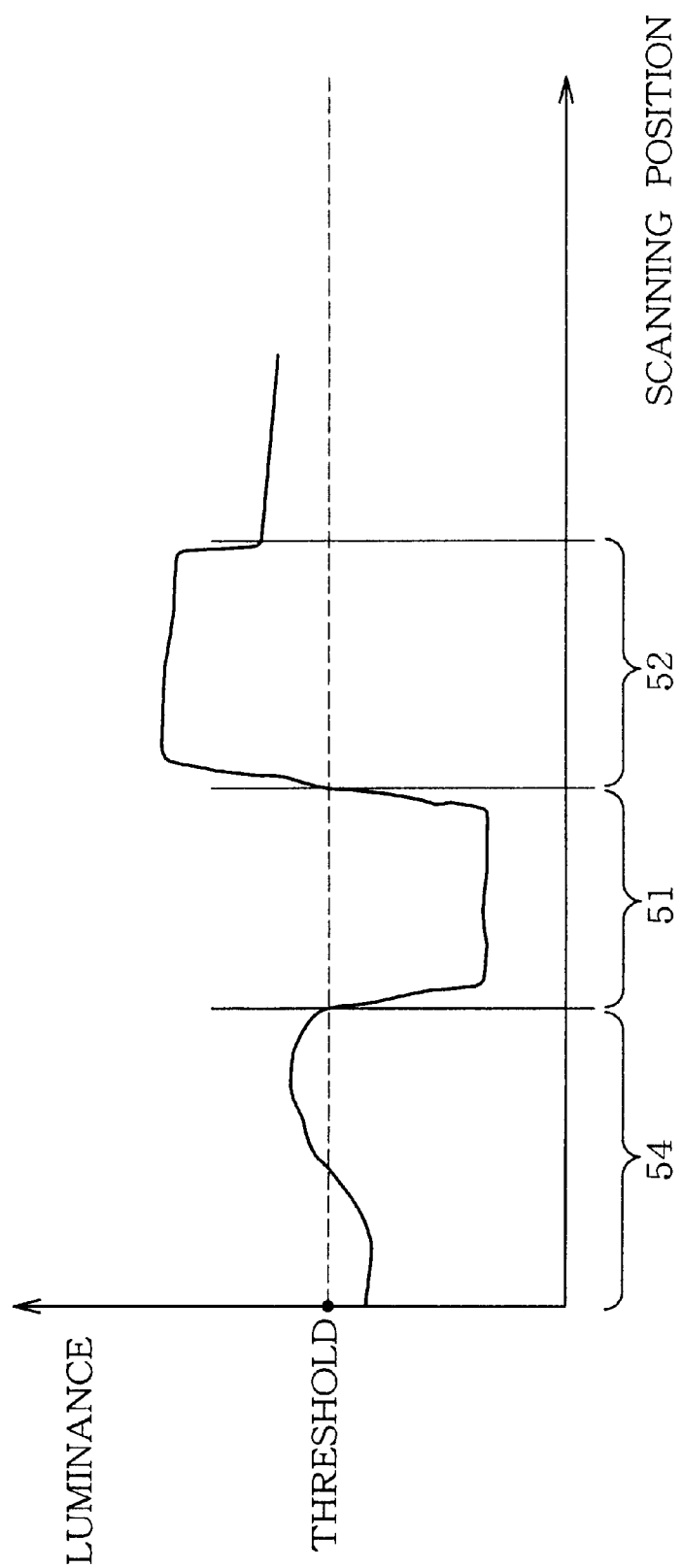
FIG. 6 is a diagram showing a detection example by the predetermined-position detecting section of the first embodiment.

Thus, the magnetic-tape library system 10 performs operation control so as to start the laser scanning of the marking 5 from a position at the upstream side of the marking 5 and closer than the total distance of the width A and width B. FIG. 6 shows a detected luminance when scanning the marking 5 from the above scanning start position. Thus, it is possible to avoid the marking 5 from being erroneously recognized because the width of each of black and white areas does not increase to the already-known value (A+B) or more even if presence of the black and white areas is erroneously recognized in accordance with the detected luminance in the area 54 at the upstream side of the marking 5.

Moreover, when the above method is used, it is preferable to set a scanning start position in a range close to A+B. Therefore, it is unnecessary to improve a mechanical accuracy.

Though the above area extracting section 43 classifies all scanning ranges into black and white areas by using a certain threshold as a criterion, any method can be used other than the above method. For example, it is also permitted to separately set a threshold for recognizing a black area and a threshold for recognizing a white area so that the next step is prevented from starting even if a luminance between these thresholds is detected.

Moreover, with respect to the marking 5, it is permitted to set the white area 52 to the upstream side of the black area 51. In this case, in the above operating steps, it is judged whether, when a detected luminance exceeds a certain threshold (step S5), the scanning range of the white area 52 is larger than the width B (step S6) and whether the scanning range of the black area 51 following the white area 52 is larger than the width A (step S7). Others are same.

Second Embodiment:

A second embodiment shows a magnetic-tape library system provided with a new marking 5A obtained by improving the above-described marking 5. The magnetic-tape library system shown as the second embodiment is different from the magnetic-tape library system 10 only in the setting of the scanning start position of a marking. Therefore, only the different point will be described below but other same configurations are provided with the same symbols and duplicate descriptions are omitted.

Figure 7:
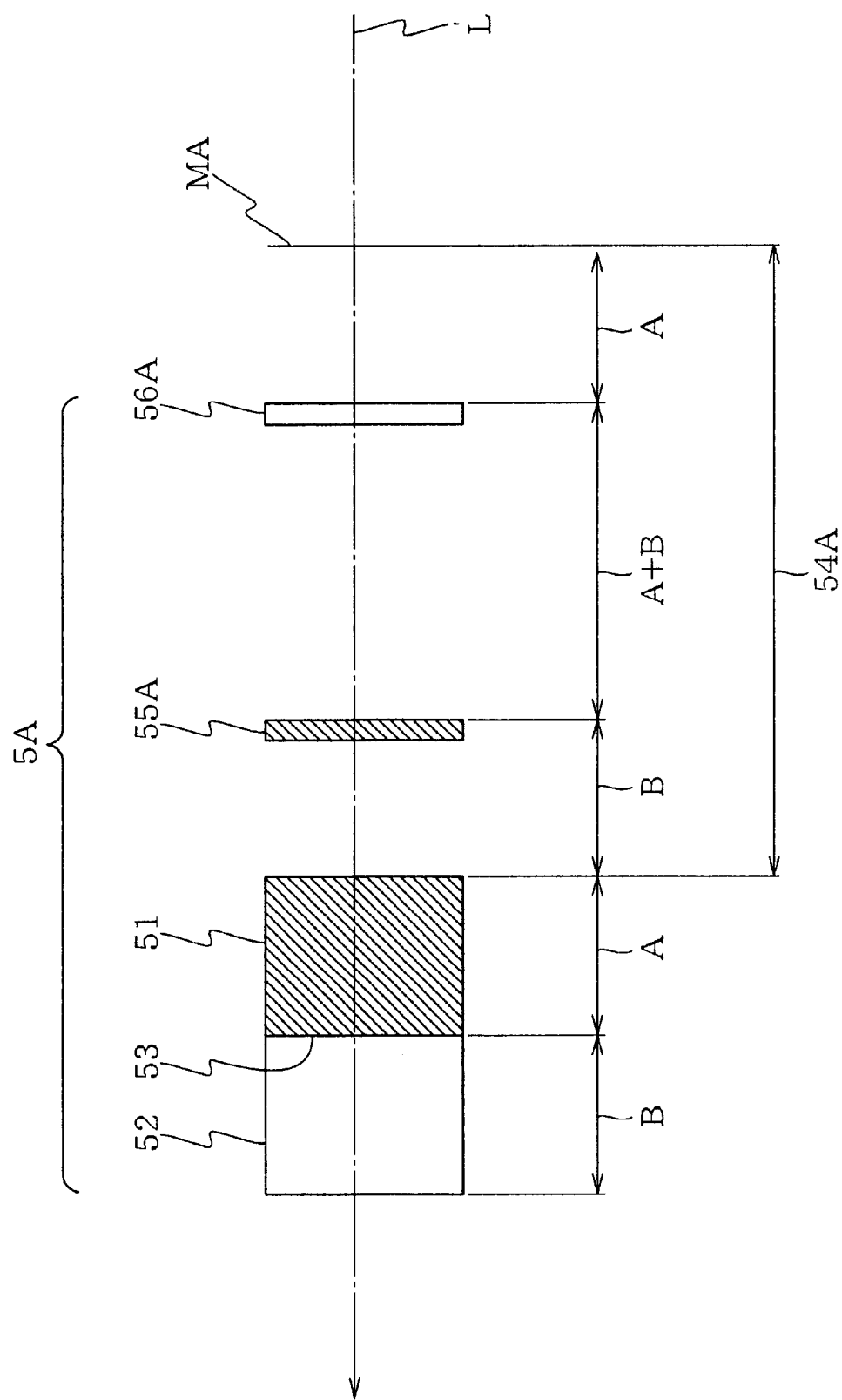
FIG. 7 is an illustration showing a marking of a second embodiment.
Figure 8:
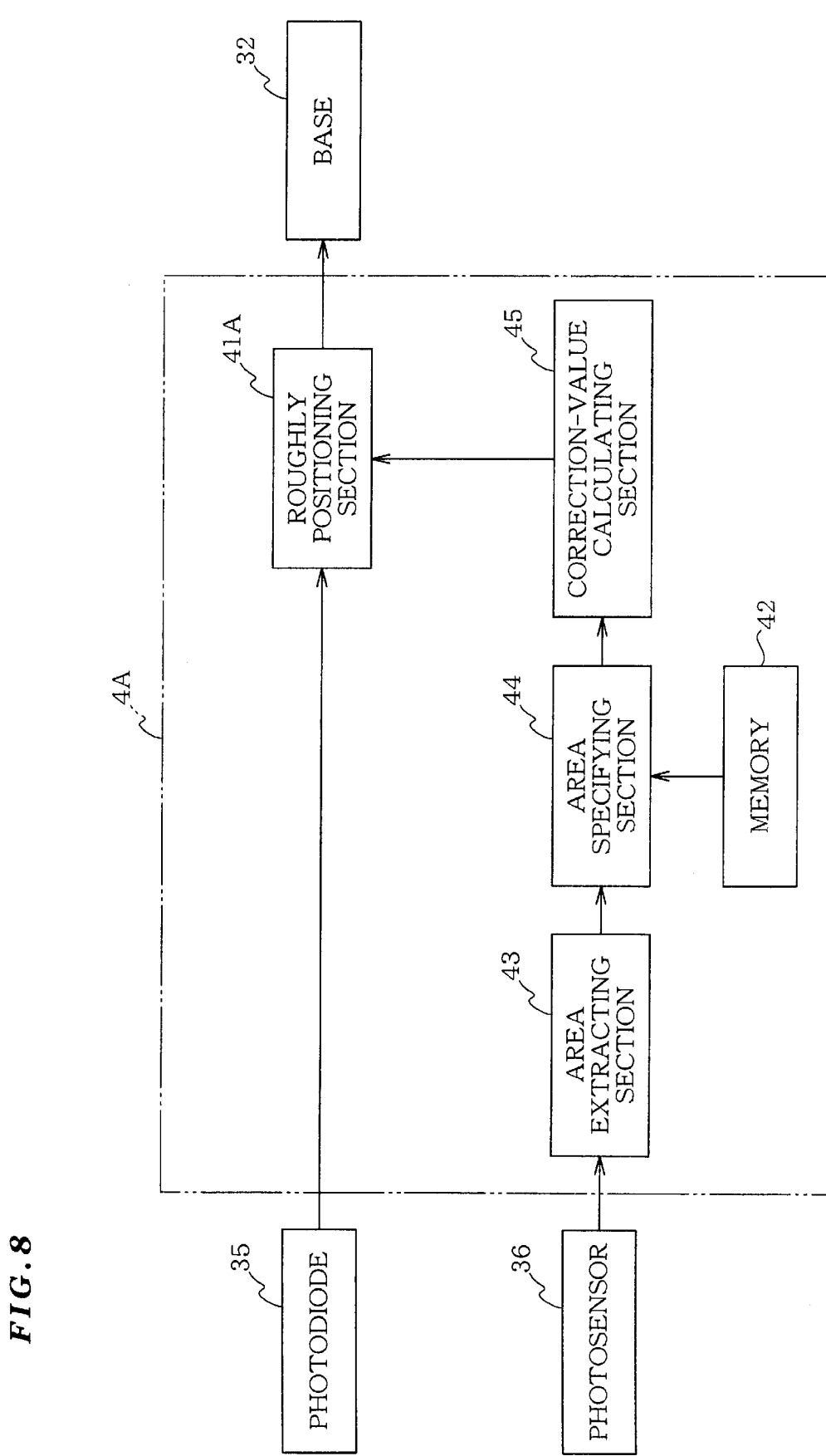
FIG. 8 is a block diagram of the control system of the second embodiment.
Figure 9:
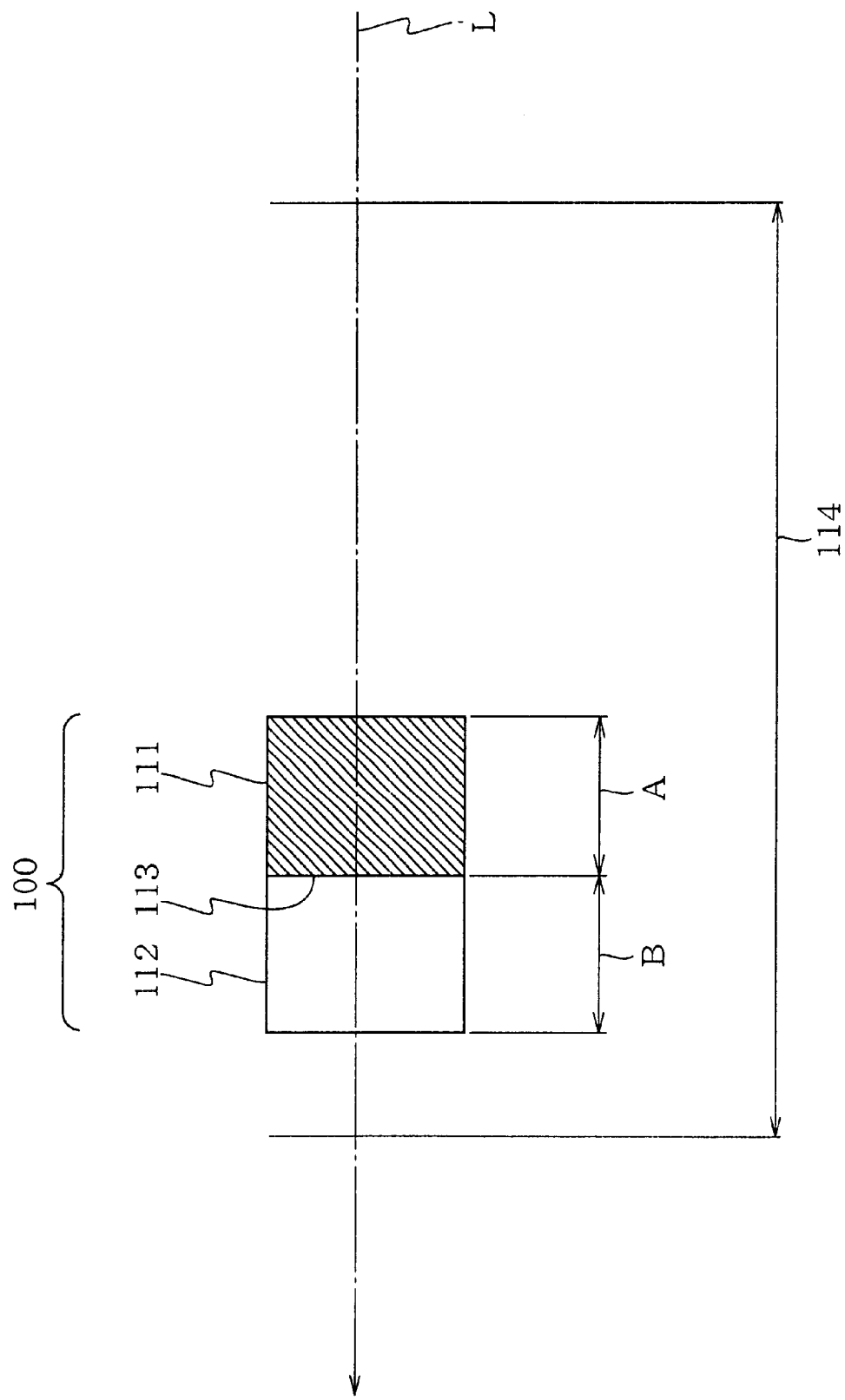
FIG. 9 is an illustration showing positioning control of a conventional marking.

As shown in FIG. 7, the marking 5A is configured by a black area 51 and a white area 52 arranged similarly to the above case and a black thin area 55A and a white thin area 56A whose scanning-directional widths are set to values smaller than those of the areas 51 and 52. Moreover, the white thin area 56A, black thin area 55A, black area 51, and the white area 52 are arranged in order from the upstream side of a scanning direction L.

Furthermore, the distance from the white thin area 56A up to the black thin area 55A is set to a value smaller than the sum of the already-known width B of the white area 52 and the already-known width A of the black area 51 and the distance from the black thin area 55A up to the upstream-side end of the black area 51 is set to a value smaller than the already-known width B of the white area 52.

Then, a controller 4A is provided with a roughly positioning section 41A for setting the target scanning-start position of a laser beam in a range 54A from a position MA closer to the white thin area 56A than the already-known width A of the black area 51 before the white thin area 56A up to this side of the black area 51.

That is, the positional relation between the above described photodiode 35 and flag 22 is set so that the laser beam source of a predetermined-position detecting section 36 irradiates the above area 54A when the photodiode 35 detects the flag 22.

That is, it is preferable to set target scanning start DA to almost the intermediate point of the area 54A and the positioning accuracy by the photodiode 35 and flag 22 is set to a value less than ½ the width of the area DA. When setting the width of the marking 5A as shown in FIG. 7, it is preferable that the accuracy is smaller than ±(A+B).

When setting the marking 5A as described above, erroneous recognition of a black area having the width A is prevented because the distance from the scanning start position up to the white thin area 56A is less than the width A. Moreover, erroneous recognition of the black area having the width A and the white area having the width B following the black area is prevented because the distance from the white thin area 56A up to the black thin area 55A is less than the width A+B. Furthermore, erroneous recognition of the white area having the width B is prevented because the distance from the black thin area 55A up to the black area 51 is less than the width B.

Therefore, it is possible to avoid erroneous recognition of the position of the boundary line 53 in a range of the area 54A which can be set up to a width approx. two times larger than (A+B) in accordance with the combination of effects. Moreover, because the area 54A can be set up to a width approx. two times larger than (A+B), it is possible to further reduce the mechanical accuracy of an apparatus as compared with the case of the marking 5.

As described above, the present invention performs operation control for starting scanning from a position closer than the sum of the already-known width of a black area and that of a white area at the upstream side of a marking for laser scanning of the marking. Therefore, even if the presence of a black area and a white area is erroneously recognized in accordance with the detected luminance of the marking at the upstream side of the marking, it is possible to avoid erroneous recognition that the black and white areas indicate a marking because the width of each area cannot be equal to or larger than an already-known width.

Moreover, in case of the above method, it is permitted to set a scanning start position in a range close to the total distance of already-known widths. Therefore, it is possible to reduce a mechanical accuracy for determining the scanning start position.

Furthermore, when a black thin area and a white thin area are provided for a marking, it is possible to prevent erroneous recognition of the marking and further reduce a mechanical accuracy for determining a scanning start position because it is permitted to set the scanning start position in a range close to two times the total distance of already-known widths.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-353606 (Filed on Dec. $11^{th}$, 1998) including specification, claims, drawings and summary are incorporated herein by reference in its entirety.

What is claimed is:

1. A magnetic-tape library system comprising:
    a magnetic-tape drive for at least reading data from a magnetic tape;
    an accessor mechanism for transferring a magnetic tape to and from the magnetic-tape drive; and
    a controller for controlling operations of the accessor mechanism;
    wherein the accessor mechanism has a hand assembly for holding the magnetic tape and a predetermined-position detecting section provided for the hand assembly to detect the predetermined position of the hand assembly to the magnetic-tape drive in accordance with the luminance of reflected light due to scanning by a laser beam,
    the magnetic-tape drive has a marking for positioning to be scanned by the laser beam,
    the marking is constituted of two adjacent areas in black and white each and these areas are arranged along the scanning direction of the laser beam; and
    the controller has a start-position setting function for setting the scanning start position of the laser beam in a range closer to the marking than to the sum of known widths in the scanning direction of the two areas before the marking and a positioning function for specifying the boundary between the black area and the white area in accordance with the change of luminances detected by the predetermined-position detecting section and the already-known width in the scanning directions of the black area and the white area and positioning the hand assembly in accordance with the position of the boundary.

2. The magnetic-tape library system according to claim 1, wherein the controller is provided with a memory for storing the already-known width in the scanning direction of the black area and the already-known width in the scanning direction of the white area, an area-extracting section for extracting a white area and a black area in accordance with the detected luminance, and an area specifying section for specifying the white area and the black area in accordance with the already-known widths of the areas stored in the memory.

3. The magnetic-tape library system according to claim 1, wherein the accessor mechanism is provided with a position detecting sensor for detecting a relative positional relation between the hand assembly and the magnetic-tape drive, and
    the controller is provided with a rough-positioning section for positioning the hand assembly to the scanning start position in accordance with the relative positional relation detected by the position detecting sensor.

4. The magnetic-tape library system according to claim 3, wherein the position detecting sensor uses a photosensor.

5. The magnetic-tape library system according to claim 1, wherein the black area is formed of a paint having a low light reflectance.

6. The magnetic-tape library system according to claim 1, wherein at least the range between the scanning start position and the marking in the area around the marking is made gray.

7. The magnetic-tape library system according to claim 1, wherein areas of the marking are arranged in order of the black area and the white area from the scanning start position toward the downstream side of the scanning direction.

8. The magnetic-tape library system according to claim 1, wherein areas of the marking are arranged in order of the white area and the black area from the scanning start position toward the downstream side of the scanning direction.

9. A magnetic-tape library system comprising:
    a magnetic-tape drive for at least reading data from a magnetic tape;
    an accessor mechanism for transferring a magnetic tape to and from the magnetic-tape drive; and
    a controller for controlling operations of the accessor mechanism;
    wherein the accessor mechanism has a hand assembly for holding the magnetic tape and a predetermined-position detecting section provided for the hand assembly to detect the predetermined position of the hand assembly to the magnetic-tape drive in accordance with the luminance of reflected light due to scanning by a laser beam,
    the magnetic-tape drive has a marking for positioning to be scanned by the laser beam,
    the marking is constituted of two adjacent areas in black and white each and a black thin area and a white thin area whose scanning-directional widths are smaller than those of the two adjacent areas, and the white thin area, black thin area, black area, and white area are arranged in order from the upstream side of the scanning direction,
    the distance from the white thin area up to the black thin area is set to a value smaller than the sum of the already-known width of the white area and the already-known width of the black area and the distance from the black thin area up to the upstream-side end of the black area is set to a value smaller than the already-known width of the white area, and
    the controller is provided with a start-position setting function for setting the scanning start position of the laser beam in a range from a position closer to the white thin area than the already-known width of the black area in its scanning direction before the white thin area up to this side of the black area and a positioning function for specifying the boundary between the black area and the white area in accordance with the change of luminances detected by the predetermined-position detecting section and the already-known widths of the black and white areas in their scanning directions and positioning the hand assembly in accordance with the position of the boundary.

10. The magnetic-tape library system according to claim 9, wherein the controller is provided with a memory for storing the already-known width of the black area in its scanning direction and the already-known width of the white area in its scanning direction, an area extracting section for extracting a white area and a black area in accordance with the detected luminance, and an area specifying section for specifying the white area and the black area in accordance with the already-known widths stored in the memory.

11. The magnetic-tape library system according to claim 9, wherein the accessor mechanism is provided with a position detecting sensor for detecting the relative positional relation between the hand assembly and the magnetic-tape drive, and the controller has a roughly positioning section for positioning the hand assembly to the scanning start position in accordance with a relative positional relation detected by the position detecting sensor.

12. The magnetic-tape library system according to claim 9, wherein the range from the scanning start position up to the upstream-side end of the black area is made gray except the thin areas.

13. A magnetic-tape library system comprising:
a magnetic-tape drive for at least reading data from a magnetic tape;
an accessor mechanism for transferring a magnetic tape to and from the magnetic-tape drive; and
a controller for controlling operations of the accessor mechanism; wherein
the accessor mechanism has a hand assembly for holding the magnetic tape and a predetermined-position detecting section provided for the hand assembly to detect the predetermined position of the hand assembly to the magnetic-tape drive in accordance with the luminance of reflected light due to scanning by a laser beam,
the magnetic-tape drive has a marking for positioning to be scanned by the laser beam,
the marking is constituted of two adjacent areas in black and white each and a black thin area and a white thin area whose scanning-directional widths are set to a value smaller than those of the two adjacent areas, and the black thin area, white thin area, white area, and black area are arranged in order from the upstream side of the scanning direction,
the distance from the black thin area up to the white thin area is set to a value smaller than the sum of the already-known width of the white area and the already-known width of the black area and the distance from the white thin area up to the upstream-side end of the white area is set to a value smaller than the already-known width of the black area, and
the controller is provided with a start-position setting function for setting the scanning start position of the laser beam in a range from a position closer to the black thin area than the already-known width of the white area in its scanning direction before the black thin area up to this side of the white area and a positioning function for specifying the boundary between the black area and the white area in accordance with the change of luminances detected by the predetermined-position detecting section and the already-known widths of the black and white areas in their scanning directions and positioning the hand assembly in accordance with the position of the boundary.

14. The magnetic-tape library system according to claim 13, wherein the controller is provided with a memory for storing the already-known width in the scanning direction of the black area and the already-known width in the scanning direction of the white area, an area-extracting section for extracting a white area and a black area in accordance with a luminance detected by the predetermined-position detecting section, and an area specifying section for specifying the white area and the black area in accordance with the already-known widths of the areas stored in the area-length memory.

15. The magnetic-tape library system according to claim 13, wherein the accessor mechanism is provided with a position detecting sensor for detecting a relative positional relation between the hand assembly and the magnetic-tape drive, and the controller is provided with a roughly positioning section for positioning the hand assembly to the scanning start position in accordance with the relative positional relation detected by the position detecting sensor.

16. The magnetic-tape library system according to claim 13, wherein the range from the scanning start position up to the upstream-side end of the white area is made gray except the thin areas.

17. A method for controlling the positioning of an accessor to the magnetic-tape drive of a magnetic-tape library system provided with a magnetic-tape drive for at least reading data from a magnetic tape, an accessor mechanism for transferring a magnetic tape to and from the magnetic-tape drive, and a controller for controlling operations of the accessor mechanism, in which the accessor mechanism has a hand assembly for holding the magnetic tape and a predetermined-position detecting section provided for the hand assembly to detect the predetermined position of the hand assembly to the magnetic-tape drive in accordance with the luminance of reflected light due to scanning by a laser beam, the magnetic-tape drive has a marking for positioning to be scanned by the laser beam, and the marking is configured by two adjacent areas in black and white each and these areas are arranged along the scanning direction of the laser beam; comprising:
a before-scanning positioning step of roughly positioning the hand assembly so that the scanning start position of the laser beam is set in a range of a distance closer to the marking than the sum of already-known widths of the areas in their scanning directions before the marking;
a scanning step of scanning an object with a laser beam by operating the predetermined-position detecting section and passing through the marking from the scanning start position;
an extracting step of extracting the then scanning range as a black area or white area in accordance with the level of a luminance detected from the reflected light of the laser beam;
a specifying step of specifying the extracted black area and the white area as a formal black area and a formal white area when the extracted black and white areas are continued and the width of the scanning range of the extracted black area becomes equal to or larger than the already-known width of the black area and the width of the scanning range of the extracted white area becomes equal to or larger than the already-known width of the white area; and a finally positioning step of adjusting the position of the hand assembly in accordance with the boundary line between the specified formal black and white areas.

18. A method for controlling the positioning of an accessor to the magnetic-tape drive of a magnetic-tape library system provided with a magnetic-tape drive for at least reading data from a magnetic tape, an accessor mechanism for transferring the magnetic tape to and from the magnetic-tape drive, and a controller for controlling operations of the accessor mechanism, in which the accessor mechanism has a hand assembly for holding the magnetic tape and a predetermined-position detecting section provided for the hand assembly to detect the predetermined position of the hand assembly to the magnetic tape in accordance with the luminance of reflected light due to scanning by a laser beam and the magnetic-tape drive has a marking for positioning to be scanned by the laser beam, in which the marking is constituted of two adjacent areas in black and white each and a black thin area and a white thin area whose scanning-directional widths are set to a value smaller than those of the two adjacent areas, and the white thin area, black thin area, black area, and white area are arranged in order from the upstream side of the scanning direction and the distance from the white thin area up to the black thin area is set to a value smaller than the sum of the width of the white area and the width of the black area and the distance from the black thin area up to the upstream-side end of the black area is set to a value smaller than the width of the white area; comprising:

a before-scanning positioning step of roughly positioning the hand assembly so that the scanning start position of the laser beam is set in a range from a position closer to the white thin area than the already-known width of the black area in its scanning direction before the white thin area up to this side of the black area;

a scanning step of scanning an object with a laser beam by operating the predetermined-position detecting means and passing through the marking from the scanning start position;

an extracting step of extracting the then scanning range as a black area or a white area in accordance with the level of the luminance detected from the reflected light of the laser beam;

a specifying step of specifying the extracted black area and the white area as a formal black area and a formal white area when the extracted black and white areas are continued and the width of the scanning range of the extracted black area becomes equal to or larger than the already-known width of the black area and the width of the scanning range of the extracted white area becomes equal to or larger than the already-known width of the white area; and a finally positioning step of adjusting the position of the hand assembly in accordance with the boundary line between the specified formal black and white areas.

19. A method for controlling the positioning of an accessor to the magnetic-tape drive of a magnetic-tape library system provided with a magnetic-tape drive for at least reading data from a magnetic tape, an accessor mechanism for transferring a magnetic tape to and from the magnetic-tape drive, and a controller for controlling operations of the accessor mechanism, in which the accessor mechanism has a hand assembly for holding the magnetic tape and a predetermined-position detecting section provided for the hand assembly to detect the predetermined position of the hand assembly to the magnetic-tape drive in accordance with the luminance of reflected light due to scanning by a laser beam, the magnetic-tape drive has a marking for positioning to be scanned by the laser beam, the marking is constituted of two adjacent areas in black and white each and a black thin area and a white thin area whose scanning-directional widths are set to a value smaller than those of the two adjacent areas, and the black thin area, the white thin area, the white area and black area are arranged in order from the upstream side of the scanning direction, the distance from the black thin area up to the white thin area is set to a value smaller than the sum of widths of the black area and white area, and the distance from the white thin area up to the upstream-side end of the white area is set to a value smaller than the width of the black area; comprising:

a before-scanning positioning step of roughly positioning the hand assembly so that the scanning start position of the laser beam is set in a range from a position closer to the black thin area than the already-known width of the white area in its scanning direction before the black thin area up to this side of the white area;

a scanning step of scanning an object with a laser beam by operating the predetermined-position detecting means and passing through the marking from the scanning start position;

an extracting step of extracting the then scanning range as a white area or a black area in accordance with the level of the luminance detected from the reflected light of the laser beam;

a specifying step of specifying the extracted white area and black area as a formal white area and a formal black area when the extracted white and black areas are continued and the width of the scanning range of the extracted white area becomes equal to or larger than the already-known width of the white area and the width of the scanning range of the extracted black area becomes equal to or larger than the already-known width of the black area; and a finally positioning step of adjusting the position of the hand assembly in accordance with the boundary line between the specified formal white and black areas.

* * * * *